(12) United States Patent
Tanaka et al.

(10) Patent No.: US 12,282,930 B2
(45) Date of Patent: Apr. 22, 2025

(54) USING A PICTURE TO GENERATE A SALES LEAD

(71) Applicant: Pilot Travel Centers, LLC, Knoxville, TN (US)

(72) Inventors: Tyler Tanaka, Knoxville, TN (US); Carol Davis, Knoxville, TN (US)

(73) Assignee: Pilot Travel Centers, LLC, Knoxville, TN (US)

( * ) Notice: Subject to any disclaimer, the term of this patent is extended or adjusted under 35 U.S.C. 154(b) by 66 days.

(21) Appl. No.: 17/362,181

(22) Filed: Jun. 29, 2021

(65) Prior Publication Data

US 2021/0406926 A1    Dec. 30, 2021

Related U.S. Application Data

(60) Provisional application No. 63/046,008, filed on Jun. 30, 2020.

(51) Int. Cl.
*G06Q 30/00* (2023.01)
*G06F 16/248* (2019.01)
(Continued)

(52) U.S. Cl.
CPC ....... *G06Q 30/0201* (2013.01); *G06F 16/248* (2019.01); *G06F 16/284* (2019.01);
(Continued)

(58) Field of Classification Search
CPC .. G06Q 30/0201; G06Q 30/016; G06Q 50/26; G06F 16/284; G06F 16/248;
(Continued)

(56) References Cited

U.S. PATENT DOCUMENTS 7,013,290 B2  3/2006  Ananian
8,918,730 B2  12/2014  von Kaenel
(Continued)

FOREIGN PATENT DOCUMENTS

WO    WO-2008154492 A2 * 12/2008  ............. G06Q 30/02

OTHER PUBLICATIONS

Rubin et al., Privacy and the Commercial Use of Personal Information, https://link.springer.com/book/10.1007/978-1-4615-1719-1, Springer Science + Business Media New York, 2002 (Year: 2002).*

*Primary Examiner* — Crystol Stewart
*Assistant Examiner* — Uche Byrd
(74) *Attorney, Agent, or Firm* — Seth L. Hudson; Maynard Nexsen PC

(57) ABSTRACT

Disclosed are various embodiments for sales lead generation utilizing a photo of a unique identifier or identifiers of a vehicle at a store. In another aspect a method for generating a sales lead from a photo of a vehicle with a unique identifier is disclosed. The method first provisions a relational database with a dataset of unique vehicle identifiers. Next, is provisioning the field device with a sales/lead application. Then executing the sales/lead application on non-transitory memory of the field device. Then capturing a photo of a vehicle with a unique identifier. Next, transmitting photo to a central system. Then processing the photo for optical character recognition with an image analysis module. The method then generates the unique vehicle identifier from the photo. Next, it accesses the relational database to perform a lookup of the unique vehicle identifier. Lastly, it generates a sales lead based on at least the unique vehicle identifier.

17 Claims, 13 Drawing Sheets

(51) Int. Cl.
*G06F 16/28* (2019.01)
*G06Q 30/016* (2023.01)
*G06Q 30/0201* (2023.01)
*G06V 20/20* (2022.01)
*G06V 20/62* (2022.01)
*G06V 30/19* (2022.01)
*G06V 30/413* (2022.01)
*G06V 40/16* (2022.01)
*G06Q 50/26* (2012.01)

(52) U.S. Cl.
CPC ........... *G06Q 30/016* (2013.01); *G06V 20/20* (2022.01); *G06V 20/62* (2022.01); *G06V 20/625* (2022.01); *G06V 30/19* (2022.01); *G06V 30/413* (2022.01); *G06V 40/172* (2022.01); *G06Q 50/26* (2013.01)

(58) Field of Classification Search
CPC ...... G06V 20/20; G06V 30/413; G06V 20/62; G06V 30/19; G06V 40/172; G06V 20/625
See application file for complete search history.

(56) References Cited

U.S. PATENT DOCUMENTS

| | | |
|---|---|---|
| 9,633,399 B2 | 4/2017 | George |
| 9,823,813 B2 | 11/2017 | Beechuk |
| 10,713,594 B2 | 7/2020 | Szeto |
| 10,902,459 B2 | 1/2021 | Flake |
| 10,977,701 B2 | 4/2021 | Crutchfield |
| 2007/0027746 A1* | 2/2007 | Grabowich ........ G06Q 30/0241 705/26.2 |
| 2010/0332291 A1* | 12/2010 | Smith ................ G06Q 30/0201 707/609 |
| 2011/0231230 A1* | 9/2011 | Christon ............ G06Q 30/0201 705/7.29 |
| 2013/0282277 A1* | 10/2013 | Rubin ............... H04W 74/0816 701/517 |
| 2015/0208043 A1 | 7/2015 | Lee |
| 2019/0228007 A1* | 7/2019 | Beard .................... G06F 16/29 |
| 2020/0356939 A1 | 11/2020 | Winters |

* cited by examiner

| VEHICLE INFORMATION | | | | | ELD/AOBRD INFORMATION (AS APPLICABLE) | | |
|---|---|---|---|---|---|---|---|
| UNIT NUMBER | VIN# | LIC PLATE STATE | LIC PLATE NUMBER | US DOT# | MAKE | MODEL | YEAR |
| 1. | | | | | | | |
| 2. | | | | | | | |
| 3. | | | | | | | |

OR

| VEHICLE INFORMATION | | | ELD/AOBRD INFORMATION (AS APPLICABLE) | | | | |
|---|---|---|---|---|---|---|---|
| TYPE OF VEHICLE | GROSS VEHICLE WEIGHT RATING | YEAR/MAKE/ MODEL | VIN# | LIC PLATE# | MAKE | MODEL | YEAR |
| 1. | | | | | | | |
| 2. | | | | | | | |
| 3. | | | | | | | |

FIG. 7

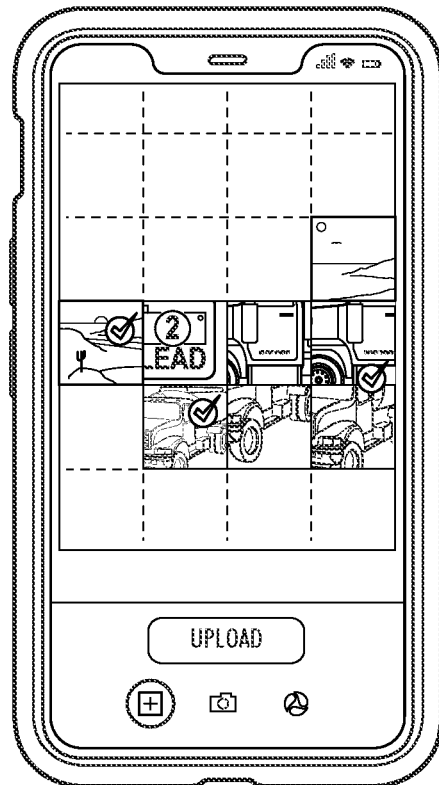
FIG.13A
FIG.13B
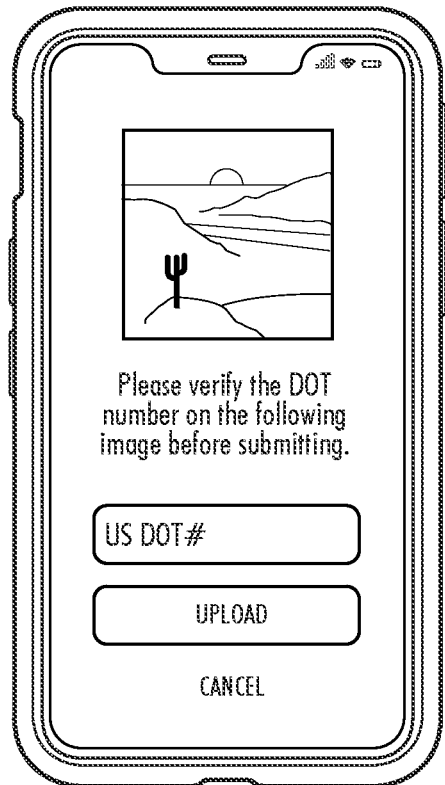
FIG.13C

USING A PICTURE TO GENERATE A SALES LEAD

CROSS-REFERENCE

This application claims the benefit and priority of U.S. Provisional Patent Application No. 63/046,008 filed on Jun. 30, 2020, entitled "USING A PICTURE TO CREATE A SALES LEAD," the contents of which is herein incorporated by reference in its entirety.

FIELD

The present disclosure relates generally to customer relationship management (CRM) including discovering and/or creating sales leads from a picture. More particularly, the present disclosure relates to using a picture or a manually entered identifier on a vehicle and processing the picture or identifier to create a sales lead for potential current or future sales.

BACKGROUND

In retail stores, filling stations, and travel centers, it is beneficial for a company to be able to manage customer information in order to properly market to their customer base. Customer relationship management (CRM) software is well known, the goal of a CRM software solution is to manage and maintain relationships and interactions with customers and potential customers. The creative use of CRM solutions in the context of retail stores, filling stations, and travel centers has remained stagnant. A typical store or travel center maintains relationships through advertisements at the refueling pump or through advertisements and loyalty programs within the store itself. Other customer interaction may occur through signage and advertisements alongside highways, with little to no post-customer follow-up. In one example, a customer may belong to a particular business organization, they may move freight, or otherwise be part of a similar service company in which a relationship and targeted marketing would be beneficial, under current technologies it is difficult to develop targeted advertising around this freight carrier and driver. As such it remains difficult to identify these customers and produce targeted marketing materials. There is a long sought need to identify and maintain contact with customers at retail stores, filling stations, and travel centers, and to be able to produce relevant and targeted marketing and tracking of those customers. The disclosure herein addresses these long sought needs.

SUMMARY

In one aspect a system for generating a sales lead from a photo of a vehicle with a unique identifier is disclosed. The system comprises a field device. The field device further comprises a sales/lead application executing in non-transitory memory. The field device further is equipped with a camera module configured to the sales/lead application, and the camera module is equipped to take a photo of the vehicle with the unique identifier. The field device further includes a communication network configured to transmit photo data from the field device to a central system. The central system comprises a network connection configured to receive photo data from the field device. The central system is further configured to a relational database that is configured with a data table of unique identifiers. The central system is further comprised of an image analysis module capable of extracting text information from the photo data received from the field device. The central system is in communication with a customer management system operatively configured to utilize results from the image analysis module to perform a lookup in the relational database for the unique identifier. Lastly, the central system interfaces with a front end website wherein a user may access the customer management system to view a sales lead.

In another aspect a method for generating a sales lead from a photo of a vehicle with a unique identifier is disclosed. The method first provisions a relational database with a dataset of unique vehicle identifiers. Next, is provisioning the field device with a sales/lead application. Then executing the sales/lead application on non-transitory memory of the field device. Then capturing a photo of a vehicle with a unique identifier. Next, transmitting photo to a central system. Then processing the photo for optical character recognition with an image analysis module. The method then generates the unique vehicle identifier from the photo. Next, it accesses the relational database to perform a lookup of the unique vehicle identifier. Lastly, it generates a sales lead based on at least the unique vehicle identifier.

BRIEF DESCRIPTION OF THE DRAWINGS

The foregoing summary, as well as the following detailed description of illustrative embodiments, is better understood with the following appended drawings. For the purposes of illustrating the embodiments, there are shown in the drawings example constructions of the embodiments; however, the embodiments are not limited to the specific systems, apparatus, and methods disclosed. In the drawings:

FIG. 7 is an example diagram of a unique identifier that may be stored in the relational database under a USDOT number;

FIG. 13A-C is an illustration of an example field device executing a sales/lead application and uploading multiple vehicles with unique identifiers to the central system;

DETAILED DESCRIPTION

Implementations and embodiments described herein can be understood more readily by reference to the following detailed description, drawings, and examples. Elements, system, and methods described herein, however, are not limited to the specific implementations presented in the detailed description, drawings, and examples. It should be recognized that these implementations are merely illustrative of the principles of the present disclosure. Numerous modifications and adaptations will be readily apparent to those of skill in the art without departing from the spirit and scope of the disclosure.

The present disclosure relates to systems and methods for obtaining information that can be used for marketing and/or for sales of various goods or services. In some embodiments, a field device, such as a mobile device may be used to capture an image of an identifier that may be printed on a vehicle, or other transport (e.g. bus, taxis, aquatic vessels, cargo containers, etc). For example, the identifier may be a Department of Transportation (DOT) number, such as a United States DOT (USDOT) number that may be printed on a vehicle (e.g., truck, van, transport vehicle, etc.) used for shipping freight or cargo. According to the Federal Motor Carrier Safety Administration (FMCSA), motor carriers are required to have a registered USDOT number if they are involved in interstate travel and if they meet at least one of the following criteria: a) have a gross vehicle weight rating or gross combination weight rating, or gross vehicle weight or gross combination weight, of 4,536 kg (10,001 pounds) or more, whichever is greater, b) designed or used to transport more than 8 passengers (including the driver) for compensation, c) designed or used to transport more than 15 passengers, including the driver, and is not used to transport passengers for compensation, d) transport the types and quantities of hazardous materials requiring a safety permit in intrastate commerce.

Figure 1:
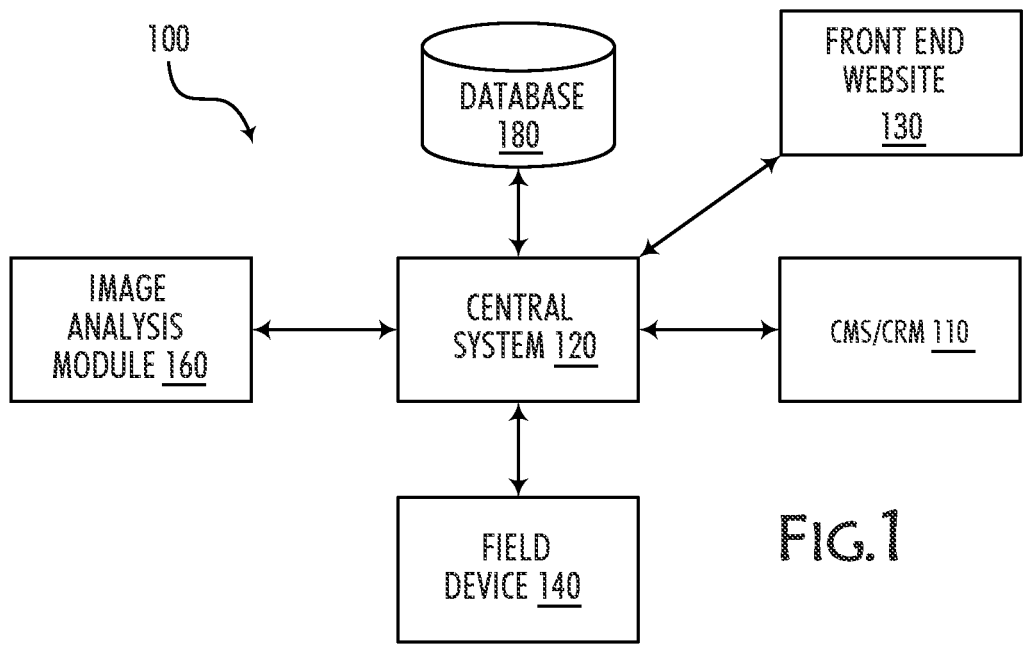
FIG. 1 is a block diagram illustrating an example system for using identification information on a vehicle and/or driver to generate a sales lead.

FIG. 1 is a block diagram of a picture and/or video to lead system 100 for using identification information about a vehicle and/or driver to generate a sales lead. The system 100 may be defined as a "picture to lead" application for using a picture (or other identifying information; e.g., license plate, driver's license, VIN, container number) in a way that may be turned into a sales lead. As shown, FIG. 1 includes a central system 120, one or more field devices 140, an image analysis module 160, a database 180, and a customer management system 110, and a front end website 130. In some embodiments, the field devices 140 may be mobile devices (e.g., mobile phones, smart phones, tablets or other device having image capturing capability and wireless communication capacity). In other embodiments, the field device 140 may be mounted hardware, such as a camera mounted to a ceiling or wall that is capable of acquiring an image. Examples of cameras include, but are not limited to IP cameras such as those made by AXIS™ Communications. Additional hardware elements may include edge computing devices and controllers outside of the field device such as Amazon's AWS Panorama appliance that allows for computer vision applications to on premise IP cameras, for a plug and play solution. Other embodiments may be comprised of microcontroller or computers such as a Raspberry Pi™ or other single board computing devices that may run application modules, interface with hardware—such as IP cameras, execute modules such as those including computer vision, and other modules that allow identification of text on vehicles.

The central system 120, image analysis module 160, database 180, and customer management system 110 may be configured as a cloud server and may be physically positioned at one location or at multiple locations throughout a network (e.g., the Internet). Further, the devices may consist of one or multiple pieces of hardware, for example, the field device 140 may also be the central system 120, wherein the database 180, the image analysis module 160, and the customer management system 110 are all comprised on the single platform. Further, the system may be broken down into an "edge" component wherein the field device may reside at the edge of the network; for example, at a filling station or convenience store, and a central system 120 may be that of a cloud server such as one provisioned by Amazon Web Services™ or Microsoft Azure™.

In the present embodiment, the field device 140 may be a mobile phone, such as an Apple™ iPhone or a Samsung™ smartphone that is equipped with an onboard camera system. Examples of typical specifications for a mobile device camera include 12 MP ultra-wide and wide camera lenses with an aperture of f/2.4 and 120° field of view on the ultra-wide lens, an f/1.8 aperture on the wide lens. The camera system may include optical and/or digital zoom with optical image stabilization. Further, the central system 120 may be configured as an Amazon Web Services™ (AWS) system, including components and modules such as AWS Lambda or AWS Elastic Load Balancing (ELB), for running software code associated with the managing of identifying information and coordinating various other components of the picture to lead system 100 in order to create a "lead" that may result in a sale. The central system 120 can pass image information to the image analysis module 160. The image analysis module 160 may be configured or provisioned as an Amazon™ "Rekognition" module or component within the central system 120 or within a field device 140, that may be used to run software code (e.g., Optical Character Recognition ('OCR') code) or other type of code for identifying objects, people, text, scenes, and activities in images and videos. In additional embodiments image analysis software such as Microsoft™ Azure Computer Vision may be used, and any other component that allow for the discoverability and extraction of text information from an image. The packages, modules, software, and references herein are used for example embodiments and in no way limit the disclosure herein.

The database 180 may be configured as an AWS Relational Database Service (RDS) system or other cloud services database, including, in certain embodiments localized data servers deployed with a relational database. The database 180 may be associated with a front end website 130 to which USDOT files can be searched, compared, and/or evaluated. The USDOT information can be uploaded on a regular schedule, such as once a month, manually by an administrator, or may be updated automatically by frequent pulls from the data resource. In some embodiments, the image analysis module 160 may be configured to recognize a USDOT number from an image captured by the field device 140. The image analysis module 160 may then pass the USDOT number (e.g., recognized by analyzing the image or video of the same) to the central system 120, which, at this point, can compare the USDOT number with corresponding records stored in the database 180. In this respect, the central system 120 may be able to query a company's data records. A confirmation can be sent to the field device 140 to indicate whether or not the USDOT number is a legitimate number or if there is a problem matching the number with registered numbers in the database 180. If the number cannot be confirmed or if there is some other type of problem, the field device 140 may be configured to instruct the user of the field device 140 to re-capture an image (e.g., if the previous image was blurry, partially blocked, etc.) or manually enter the USDOT number. Similarly, if the USDOT or identification is recognized but found invalid, such a notification alert, or log may be created and may aid in compliance and conformity with the Department of Transportation.

In other aspects, the database 180 may hold features of a driver and/or a vehicle, or transport, in which can be used to distinguish and develop targeting marketing. In this regard, the database may be provisioned with fields such as those highlighted in FIG. 7, or additional fields that may be deployed including vehicle identification number (VIN), license plate number, color, make, model, and physical attributes regarding the driver or logos or other images that may distinguish the vehicle. In this regard a vehicle is defined broadly as any device capable of mobility and transporting.

The central system 120 may be configured to communicate with the customer management system (CMS) 110 to pass along information about a vehicle and/or a driver at a particular location (e.g., a specific store, filling station, etc). For example, the customer management system 110 may be configured as a Salesforce Sales Cloud (SSC) system. The customer management system 110 may be configured to use the information in an appropriate manner to enact a marketing or sales strategy targeted to the driver of the vehicle or to a company associated with the vehicle. This strategy may incorporate a score or a scoring system, for example, a particular strategy may be to identify vehicles and/or drivers who are employed by small operations. In this regard the scoring system may indicate USDOT numbers that are affiliated with small enterprises and tag those numbers as hot, while existing customers or potential customers affiliated with larger enterprises may be tagged mild, or cold. This strategy may be able to increase sales based on the specific location and time/date that the vehicle is parked or has entered a parking lot of a specific travel center or store.

In some cases, the marketing strategy or sales lead may be associated with certain products or services offered at that specific travel center or store. In other cases, the marketing strategy may be directed to the driver or trucking company for potential future sales based on where the driver may be headed. For example, if the driver pulls into a Pilot Flying J™ service station to fill his or her vehicle with fuel, it may be beneficial to obtain a sales lead for encouraging the driver to stop at another Pilot Flying J™ service station down the highway where the driver may need to stop again.

According to some embodiments, a user (e.g., store owner, store clerk, travel center technician, etc.) may use a field device 140 (e.g., mobile device) to obtain identifying information associated with a vehicle. More particularly, the field device 140 may be used to capture an image or photo of a USDOT number (or other suitable identifying information) printed on the vehicle. Other identifying information may include a license plate number or other registered identifying data for any country/state/city/region. In further embodiments, a field device 140 may capture a driver's license or other identification that may be associated with a driver and a vehicle. In even further embodiments the vehicle identification number (VIN) may be captured by the field device 140 and transmitted to the central system 120.

The field device 140 may be able to capture an image of the USDOT number using a camera feature on the field device 140. In other embodiments, the USDOT number may be entered manually using a keypad on the field device 140. According to still other embodiments, the field device 140 may use a scanning feature to scan a barcode, QR code, or other suitable type of code associated with the vehicle. Also, the field device 140 may include a wireless (e.g., Bluetooth, NFC) feature for communicating with the vehicle to obtain the identifying information using a short range protocol.

Thus, the field device 140 can obtain a picture or image of the identifying information through a variety of means as disclosed herein. When the image is captured, the field device 140 may be configured to associate the image with a timestamp for marking the time, date, year, etc. In some embodiments, the field device 140 may include a location or position tracking feature, such as a Global Positioning System (GPS) module. As such, the image, time/date, and location information can be combined to create a geo-tagging data point. In some embodiments, the field device 140 may be configured to track or determine how long the vehicle remains in a certain location (e.g., in a parking lot of a store), which may include a start time when the vehicle first arrives at the store and an end time when the vehicle leaves the store. Additional techniques may include developing a geo-fence around the travel center or store that would track vehicle movements, time spent, and more. More importantly, through continued monitoring of the vehicle at the various store GPS locations may account for travel patterns and aid in developing rules to implement in the business rules engine.

Furthermore, according to some embodiments, the field device 140 may also be used to obtain the make and model of the vehicle. The make and model may be obtained via the image capture device (e.g., camera or other optically-based device) or by allowing the user to enter the information manually. The make and model may be further combined with the color, the year, and other attributes of the vehicle to build a profile of the vehicle. Also, the field device 140 may be able to capture an image of the driver of the vehicle. In that regard the information may be useful for other practical purposes such as emergency notices and alerts regarding the whereabouts, and driver of a particular vehicle.

In the situation where the field device 140 obtains an image (picture or video) of the USDOT number and/or other objects or identifying features (make, model, color of vehicle), the image or images are communicated to the central system 120. As mentioned above, the image can be sent to the image analysis module 160 to use a OCR process to determine the USDOT number within the image. The image analysis module may be a programming module or library or application configured on the central system 120 of which may be a cloud server or a local server or even the field device 140 itself. If the USDOT number is manually typed into the field device 140, the central system 120 does not need to use the image analysis module 160, and in this case and can thus compare the USDOT number with registered numbers in the database 180 for comparison. Similarly, the field device 140 may capture the picture or video and have the central system 120 built into the device, wherein the system is running at the "edge" of the configuration and may offload additional processing tasks to a cloud server. In the edge framework the field device 140 may execute a module within a sales/lead application that performs OCR on the picture or video. The resulting unique identifier may then be referenced with a database 180 within the field device 140 that may synchronize unique identifiers from a subscribed server or other data provider such as an additional database. Further, the customer management system 110 may also be on the field device 140 and executing within the sales/lead application.

Figure 5:
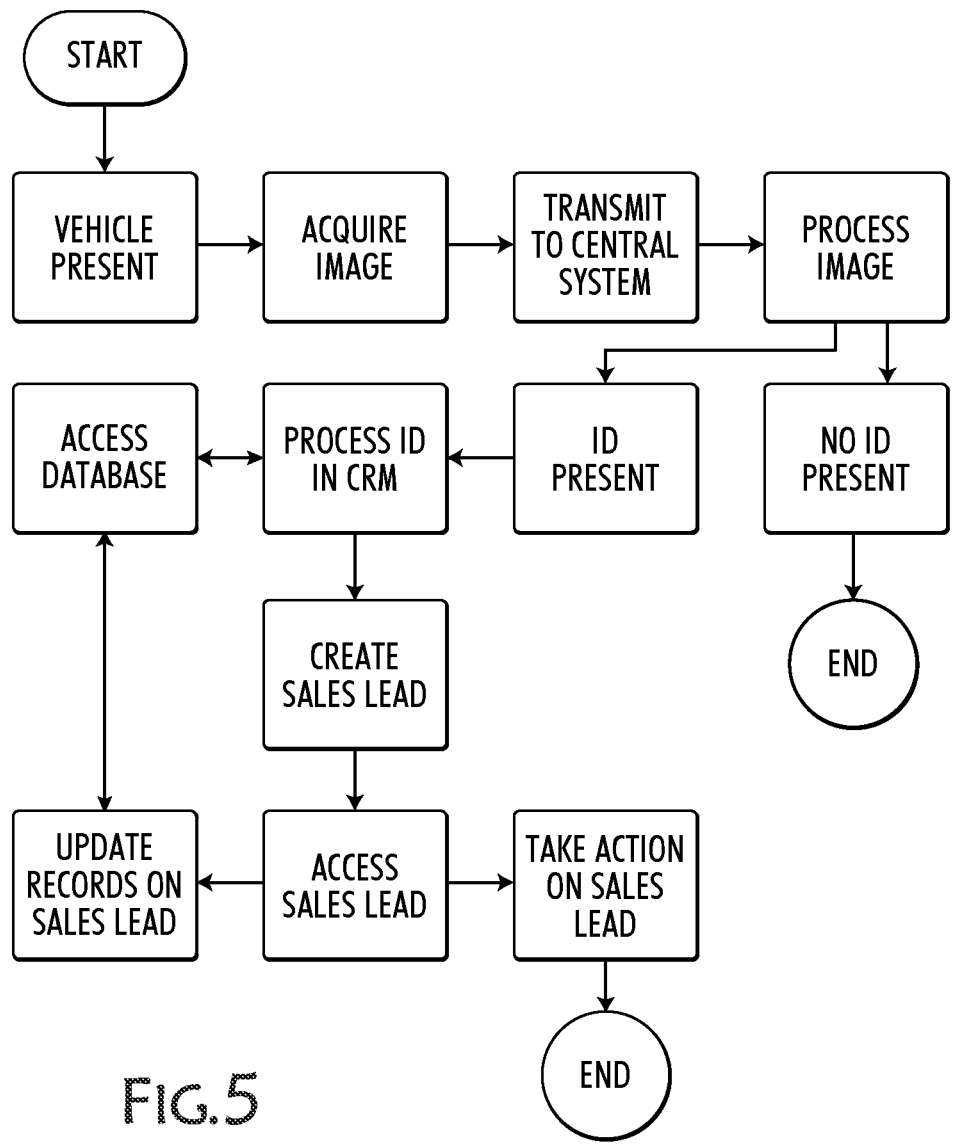
FIG. 5 is a flow chart of an example method of using identification information about a vehicle and/or a driver to generate a sales lead.

The image analysis module 160 may be used to convert an image into text by using a suitable text recognition procedure (further discussed in FIG. 5). In some cases, the image analysis module 160 may be configured to perform other types of image recognition, such as facial recognition to determine the identity of the driver of the vehicle, or of image recognition of a vehicle for make, model and color. The central system 120 can use the USDOT number to determine the identity of the vehicle or the identity of one or more drivers associated with that particular vehicle. Also, the central system 120 determines other types of data associated with a company that owns the vehicle by querying the company data records. Various types of marketing data (e.g., the USDOT number, identity of the vehicle, identity of the driver, make, model, color, purchases, purchase history, time, date, location, etc.) can be sent to the company or store associated with the system 100 in order for the company to market their goods or services in a customized manner based on the data. Often times this may be stored in the database 180 along with the unique identifiers or part of the customer management system 110 in which the system may be used to score leads or otherwise identify potential customers. The customer management system may consist of a SalesForce™ CRM platform with customization as it relates to the particular customer or target customer, industry, and objective. The customer management system may include the software capable of installing or connecting to a remote CRM server, and may also facilitate the integration of the specific CRM within the context of the sales/lead module and the disclosure herein.

Figure 2:
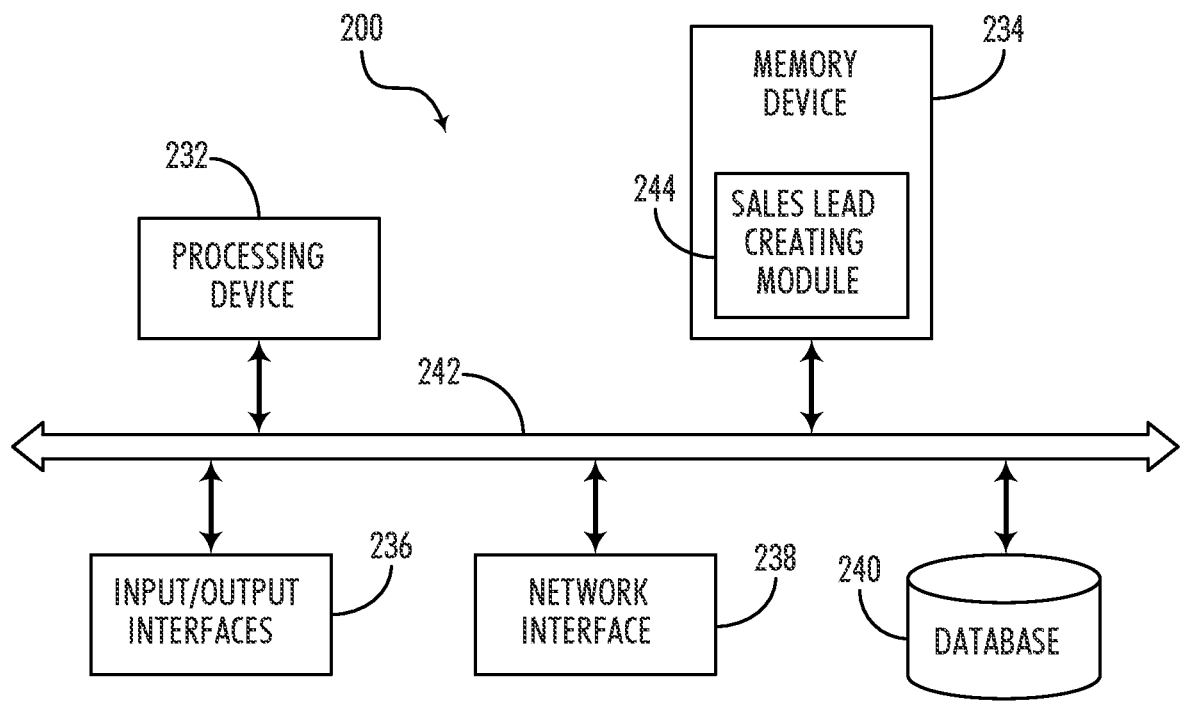
FIG. 2 is a block diagram illustrating an example of a computing system for using identification information on a vehicle and/or driver to generate a sales lead.

FIG. 2 is a block diagram illustrating an embodiment of a computing system 200 for generating a sales lead from a picture or video, which may represent one of more of the computing components (i.e., the central system 120, field device 140, image analysis module 160, database 180, and/or customer management system 110) shown in FIG. 1. The computing system 200 is configured for use within the system 100 or network in which the system 100 operates. In the illustrated embodiment, the computing system 300 may be a mobile computing device, such as a field device, that in terms of hardware architecture, generally includes a processing device 232, a memory device 234, input/output (I/O) interfaces 236, a network interface 238, and a database 240. The memory device 234 may include a data store, database, or the like. It should be appreciated by those of ordinary skill in the art that FIG. 2 depicts the computing system 200 in a simplified manner, where practical embodiments may include additional components and suitably configured processing logic to support known or conventional operating features that are not described in detail herein. The components (i.e., 232, 234, 236, 238, 240) are communicatively coupled via a local interface 242. The local interface 242 may be, for example, but not limited to, one or more buses or other wired or wireless connections. The local interface 242 may have additional elements, which are omitted for simplicity, such as controllers, buffers, caches, drivers, repeaters, receivers, among other elements, to enable communications. Further, the local interface 242 may include address, control, and/or data connections to enable appropriate communications among the components 232, 234, 236, 238, 240.

The processing device 232 is a hardware device adapted for at least executing software instructions. The processing device 232 may be any custom made or commercially available processor, a central processing unit (CPU), an auxiliary processor among several processors associated with the computing system 200, a semiconductor-based microprocessor (in the form of a microchip or chip set), or generally any device for executing software instructions. When the computing system 200 is in operation, the processing device 232 may be configured to execute software stored within the memory device 234, often referred to as non-transitory memory, to communicate data to and from the memory device 234, and to generally control operations of the computing system 200 pursuant to the software instructions. It is important to note that the memory device, may be a non-transitory memory device of computer readable media that stores data for short periods or in the presence of power such as random access memory as the processor executes segments of machine readable code.

It will be appreciated that some embodiments of the processing device 232 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 232 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 236 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 36 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface. In one example the I/O interface 236 may configure with a plug and play camera assembly or with a lens assembly for acquiring a photo or video. In other embodiments additional peripherals such as a LIDAR assembly may be configured to the system 200.

The network interface 238 may be used to enable the computing system 200 to communicate over a network, such as the network on which the system 100 operates, the Internet, a wide area network (WAN), a local area network (LAN), and the like. The network interface 238 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac/ax). The network interface 238 may include address, control, and/or data connections to enable appropriate communications on the network of system 100.

The memory device 234 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 234 may incorporate electronic, magnetic, optical, and/or other types of storage media. The memory device 234 may have a distributed architecture, where various components are situated remotely from one another, but can be accessed by the processing device 232. The software in memory device 234 may include one or more software programs, each of which may include an ordered listing of executable instructions for implementing logical functions. The software in the memory device 234 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 234 may include a data store used to store data. In one example, the data store may be located internal to the computing system 200 and may include, for example, an internal hard drive connected to the local interface 242 in the computing system 200. Additionally, in another embodiment, the data store may be located external to the computing system 200 and may include, for example, an external hard drive connected to the I/O interfaces 36 (e.g., SCSI or USB connection). In a further embodiment, the data store may be connected to the computing system 200 through a network and may include, for example, a network attached file server.

Moreover, some embodiments may include a non-transitory computer-readable storage medium having computer readable code stored in the memory device 234 for programming the computing system 200 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, random access memory (DRAM, SRAM), and the like. When stored in the non-transitory computer-readable medium, software can include instructions executable by the processing device 232 that, in response to such execution, cause the processing device 232 to perform a set of operations, steps, methods, processes, algorithms, functions, techniques, etc. as described herein for the various embodiments. For example, the sales lead creating module 244 may be configured to be held in non-transitory computer readable storage and executed through the processing device 232.

According to various embodiments of the present disclosure, the memory device 234 may be configured to store a software or firmware program having code or logic instructions for causing the processing device 232 to perform various functions. In some embodiments, the memory device 234 may store a sales lead creating module 244. The sales lead creating module 244 may alternatively be configured in hardware for performing the functions described herein. The various components 120, 140, 160, 180, 110 of the system 100 of FIG. 1 may include parts or all of the features of the sales lead creating module 244 in order to provide a coordinated system for allowing the components 120, 140, 160, 180, 110 to operate together to enable the identifying information (e.g., USDOT number) to be used to create a sales lead based on the location, time/date, and identity of the vehicle (make, model, and color) and/or identify features and aspects of the driver of the vehicle. In this way, the sales lead creating module 244 may be configured with the customer management system 110 from FIG. 1, to target a company or organization associated with the vehicle, a driver of the vehicle, or other entities associated with the vehicle to provide strategies that may lead to increased sales of goods and/or services of the company associated with the sales lead creating module 244, computing system 200, and/or one or more components of the system 100.

Figure 3:
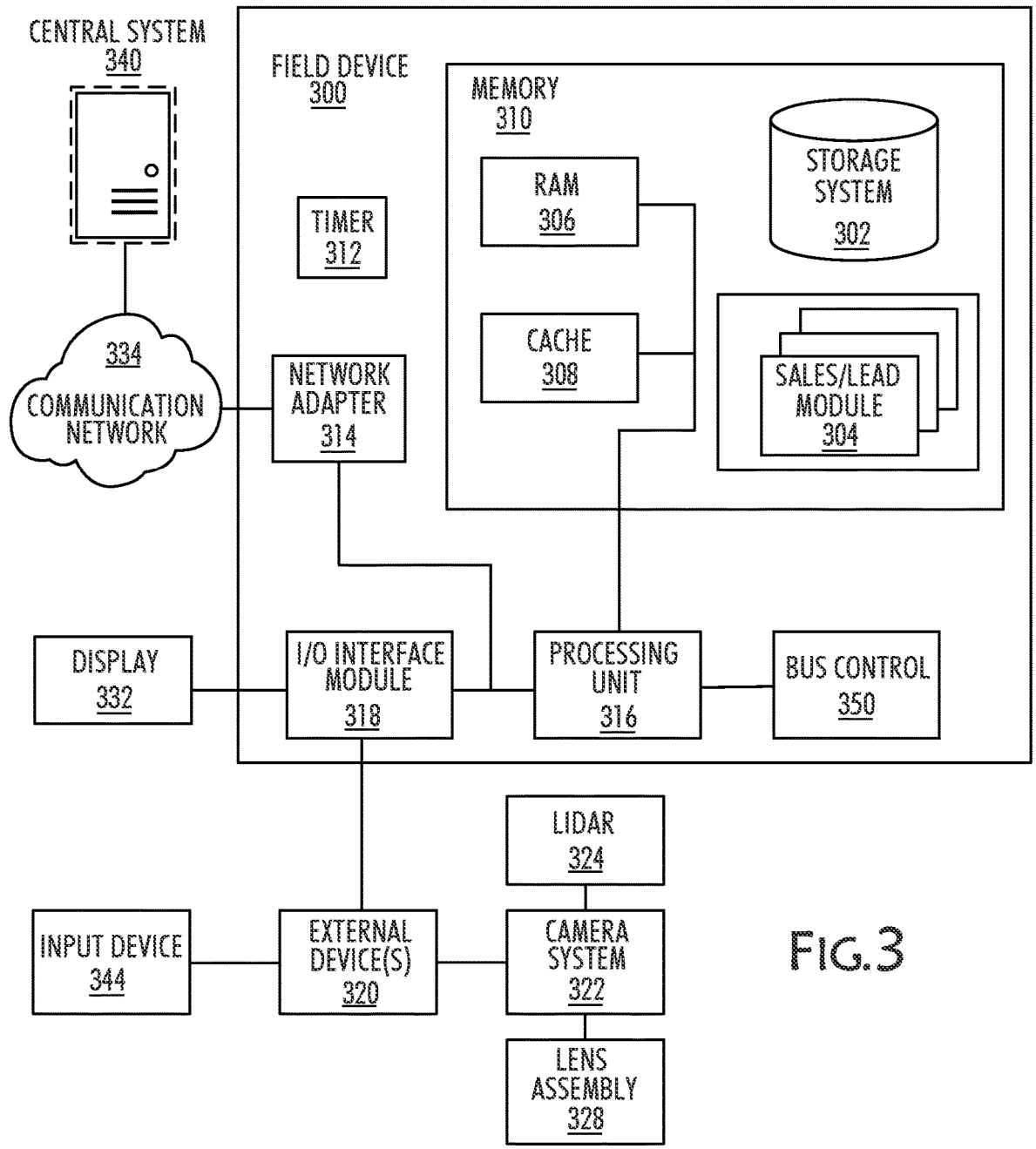
FIG. 3 is a block diagram of an example embodiment of components of a field device.

Turning now to FIG. 3 a block diagram of an example embodiment of components of a field device and/or a central system. The field device 300 is configured with memory 310, that as previously discussed may be comprised of non-transitory storage media such as random access memory 306 and hard drive storage system 302, wherein the sales lead module 304 may be stored and machine readable instructions transmitted to the processing unit 316. A timer 312 is typically built into the hardware for clock speed, sequencing, bus speed, and other synchronization across the system. The cache 308 holds instructions from RAM 306 in a buffer and transmit the instructions through a bus connection that is maintained by a bus control 350 module to the processing unit 316. The processing unit as discussed in FIG. 2 may be any unit capable of processing instructions from non-transitory memory.

In the example of FIG. 3 a sales/lead module such as an application may be installed on the field device 300 or it may be part of a system, for example it may be a piece of hardware such as an Amazon Panorama Device. The field device 300 may be an edge device or parts of the system components may be located on the cloud or within a remote location. The field device 300 in the example embodiment is one example of many combinations of modules and hardware that may comprise a field device 300.

The I/O interface module 318 is configured for input and output to external devices 320, including devices such as a camera system 322, wherein the camera system 322 may further be comprised of a LIDAR system 324 and an advanced lens assembly 328. Furthermore, in the example embodiment the I/O interface module 318 is one connection, the field device 300 may have embedded system such as a camera system 322 embedded onto a single board. Further, the I/O interface module may comprise any addressable bus space and facilitate plug and play operations that allow for incorporating a variety of peripheral components. In the example input devices 344 may be peripherals such as a keyboard, mouse, trackpad, or other input device that may supply input to the field device 300.

In the example, the central system 340 may be an on premise central system or may be a cloud based system. The central system may be a device such as the Amazon Panorama™ or a Raspberry Pi™ or a computing device capable of facilitating the system and method disclosed herein. The communication network (previously discussed) in the example embodiment may comprise both a local area network LAN or a wide area network WAN, or any of the various other protocols, including combinations thereof such as Ethernet, WiFi, cellular, radio, Bluetooth™ NFC, and many more. Further, the various cellular communication standards are also contemplated, such as 5G, 4G, 3G, edge. The communication network may provide access from the picture or video device, which may be a field device 300 or a stand-alone device such as an IP camera that transmits the photo or video data through the communication network to the various components such as a field device 300 or a central system 340. The communications network 334 is facilitated by a network adapter 314 configured to the various communication pathways available on the communication network 314. The throughput and capacity of the communications network is determined by the volume of data transferred (e.g. photo or video quality, compression algorithm, storage capacity, buffer size) from the device acquiring the photo or video data, in some examples a 20 mbps upload and download link is required, in other a 100 kbs link may be sufficient for rural areas or areas with low traffic.

Figure 4:
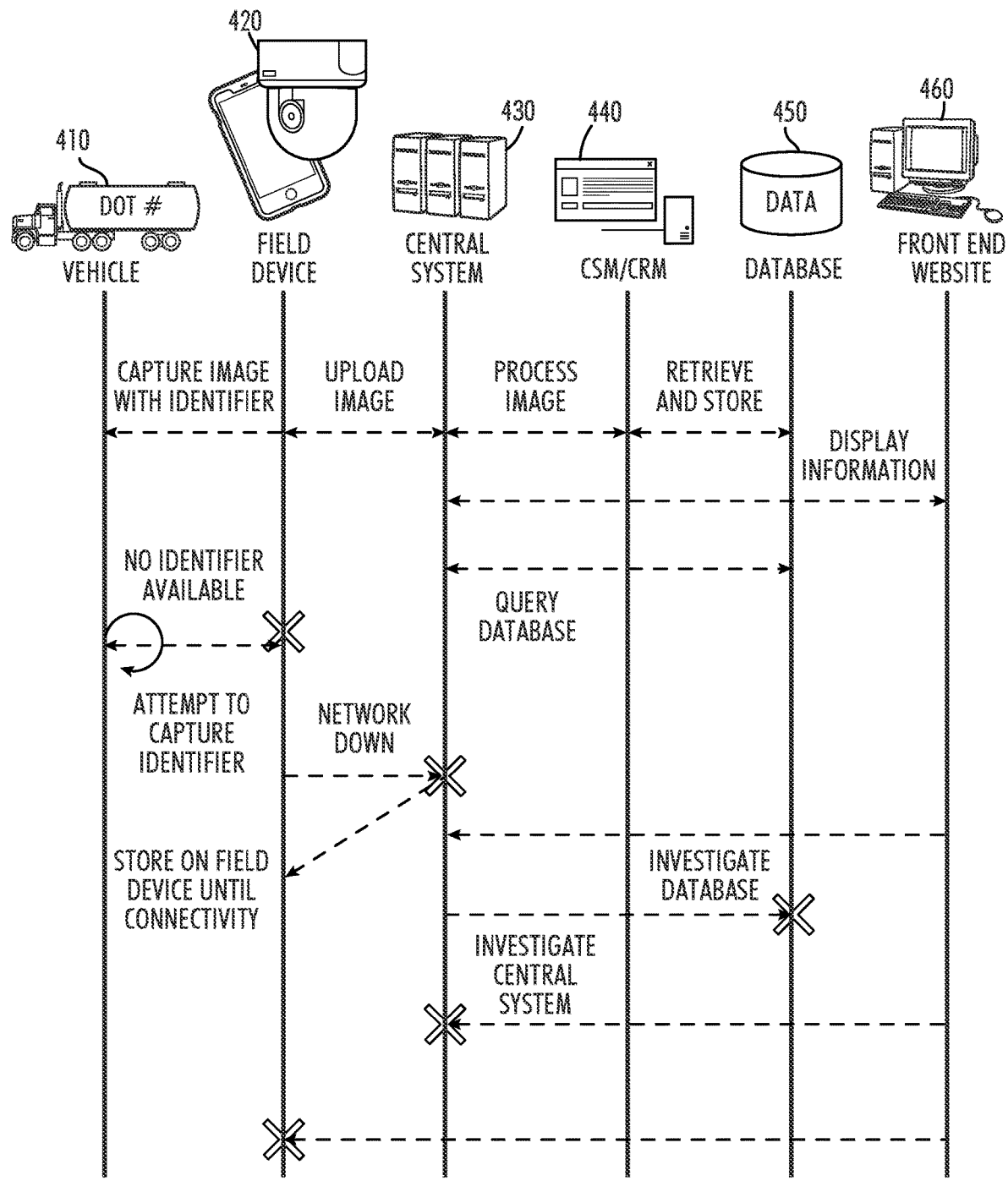
FIG. 4 is a sequence diagram illustrating an example call sequence in using identification information about a vehicle and/or a driver to generate a sales lead.

Referring now to the example embodiment of FIG. 4, a call sequence illustration disclosing systems and methods herein of using identification information (photo or video) about a vehicle and/or a driver to generate a sales lead. In one aspect a vehicle 410 with a unique identifier, such as a DOT number—USDOT is located at or near a store or travel center, wherein the field device 420 is able to take a photo or video of the vehicle 410. In other aspects the unique identifier may be the make, model, and/or color of the vehicle, or in even further examples it may be information about the driver of the vehicle such as the driver's license number, or facial or body features (hair, skin, distinguishing facial features, marks, clothing, appearance). The field device 420 captures a photo or video of the vehicle and/or driver and in the example of a unique identifier being a USDOT number transmits the photo or video to the central system for image recognition and/or optical character recognition. In some aspects the image recognition and/or OCR may occur on the field device 420 or at the edge of the network, wherein the central system may be located at the edge with the field device 420. The central system, in this example, recognizes the USDOT unique identifier and performs a lookup within the customer relationship module or CRM module 440 for existing data on the unique identifier, such fields may include those addressed in FIG. 7 as well as additional information that may be created and stored by the user or organization of the system. A sampling of data fields may include stores the vehicle has visited previously, locations, time, purchase history, length of stay, vehicle fleet identity, vehicle ownership, to name a few. The central system 430 or the CRM module 440 may perform a lookup in the database 450 which may be a third-party repository storing information on USDOT unique identifiers, such data repositories may be compiled through government records by government actors or provided by other organizations. Additional databases may be provisioned for the storage of CRM information, or for reference and access by the central system 430. The CRM module 440 may be the same module as the customer management system in FIG. 1, or it may be a separate client that is accessible across a network connection, furthermore the CRM may be localized and may be edge based. Typical configurations of the CRM module 440 will connect through a network to a corporate office wherein analyzing the various sales/leads may take place along with accessing and looking up relevant unique identifiers from the database 450.

The front end website 460 is a web portal that may be accessed through a url on a browser that gives a dashboard to the central system 430 and CRM module 440. The front end website 460 allows overview and quick accessibility and may be built into the sales/lead application executing on the field device 420. In that regard the field device 420, in one example, may serve as the central system, the CRM module, the database, and the front end website. Most typically features and functions such as computer vision processes like image identification and OCR may occur on a server, wherein the field device 420 offloads computing power to the server for results. In other aspects the front end website 460 gives "on the fly" information to stores, filling stations, or travel centers wherein the employees may be able to receive notifications or announcements of potential sales/leads and or the ability to customize or tailor marketing at the filling pumps or within the store or travel center to build a more targeted and personalized advertisement and marketing experience. In another aspect, the field device 420 is enabled with access to the front end website 460 wherein the agent or user of the field device may have CRM module information about the customer at the store and be able to suggest or market products or services the customer is known to purchase.

In the example of FIG. 4 the call sequence also provides for diagnostic verification of the system and allow for rapid detection and addressability of hardware and software components. In one aspect if no identifier is found the field device 420 may continue to refresh with additional images or views as well as try different contrast and utilize other potential hardware aspects such as LIDAR for focus adjustment and low light focus improvement. In additional embodiments a user from the front end website 460 may be able to diagnose the various components depending upon feedback received as disclosed in FIG. 4.

Referring now to FIG. 5, a flow chart of an example method of using identification information about a vehicle and/or a driver to generate a sales lead. In the example a vehicle presents at a location, typically a store, a filling station, or a travel center. The vehicle is captured on an edge device, such as a field device that may be an IP camera, a video camera, a mobile device, or other photo or video capturing hardware that interfaces with the system disclosed herein. Once the image is acquired the data or information that the picture or video is comprised of is transmitted through a local network or through a cellular network to a central system for processing. In other aspects the field device may process the image, or it may be transmitted to a cloud server for processing, or an edge host of computing hardware may receive the photo or video data and may process the image. If in processing the OCR technique cannot identify a unique identifier the system may repeat itself until the vehicle and/or driver is no longer visible in the camera system of the field device. This process repeats with each vehicle and/or driver is no longer at location or the systems detects it is incapable of acquiring a unique identifier.

If an identification is found such as a USDOT number, the central system or field device may process the unique identifier with a customer management system or a CRM module, wherein the information acquired from the customer visit is logged. The customer management system may the create a sales lead or in coordination with the central system perform a lookup or a search on a database with USDOT numbers or unique identifiers in which additional information may be incorporated into the system. Accordingly, the customer management system or CRM, or even the central system may update the records for the sales lead with information from the database and provide access to the information and the new sales lead for an employee or agent to take action or for a computerized system to adjust marketing and advertising accordingly, such as a video display aptly placed for the customer while refueling.

The customer management system or CRM may also involve a business rules engine, wherein the business rules engine generates a score based on in part the unique identifier and the owner/operator (e.g. commercial entity that owns or operates a fleet of vehicles) of the vehicle. In this manner, a potential customer may be identified and a sales lead generated wherein the unique identifier, such as a USDOT number is identified by the field device and identified as a potential customer. In one algorithm, the identification of a USDOT number that is not in the system as a previous client, or in the system as a cancelled client or a client not available will move to an opportunity client. The opportunity client may be weighted with regard to other factors such as previous business, size of fleet the vehicle is operating under, purchase size, purchase frequency, and more. When ranking the customer management system or CRM may assign a hot, mild, and cold tag to the various USDOT numbers or unique identifiers or even each unique vehicle or driver. The assignment of hot, mild, and cold may also be represented in other forms such as a number ranking system or any other score in which to convey that the sales lead is a good sales lead, an okay sales lead, or a poor or low chance of conversion sales lead. The business rules engine may reside in the central system as a module, similar to the CRM or customer management system or module, or may reside within the CRM or customer management system. Furthermore, the business rules engine may be part of a cloud services offering such as offerings by SalesForce™.

Figure 6:
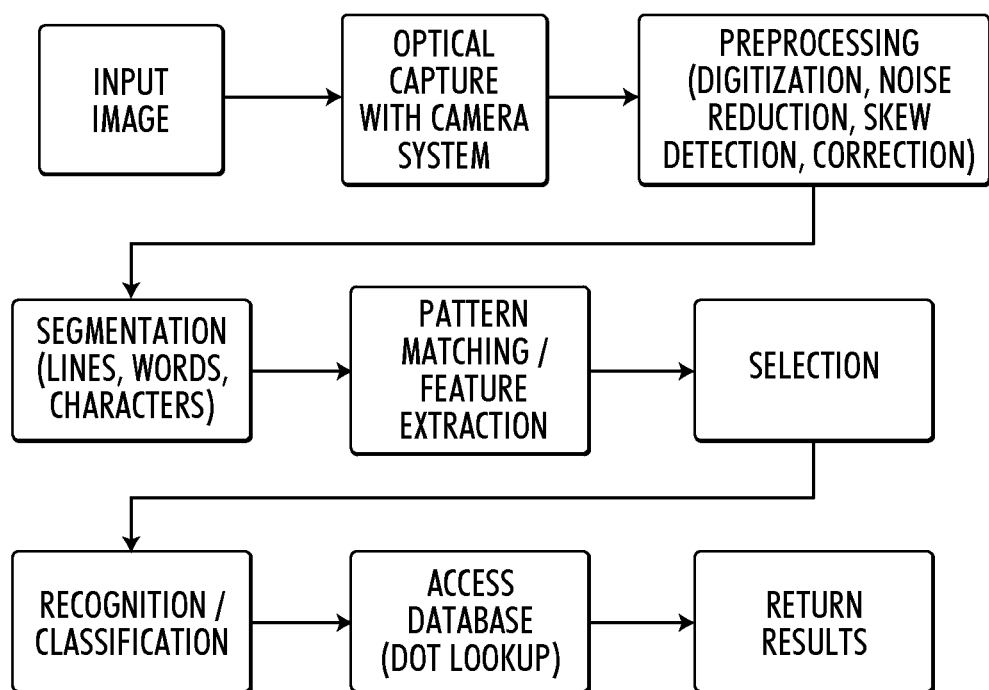
FIG. 6 is a flow chart of an example method for OCR within the image analysis module.

Referring now to FIG. 6, a flow chart of an example method for OCR within the image analysis module. OCR in the general sense is the extraction of text from images, those images may be photos or videos or both. Attributes for detecting text include the text density, structure of the text, fonts, character types, artifacts and location, to name a few. A popular library for "automatic license plate number recognition" is OpenALPR, which is dedicated to the task of identifying characters and is ported to several languages include C, C++, python, and Java. There are many libraries available with tools in which the parameters are adjusted to produce the best results for the given environment. In one aspect, a python library such as OpenCV may be used in combination with Tesseract OCR, originally developed by Hewlett Packard in the 1980s and now an open source module, to identify and extract characters and text. In yet another aspect, Amazon's Reckognition™ software and API may be used to preprocess and perform OCR, as well as feature extraction and the like with advanced computer vision modules. Regardless of the algorithm, software suite, and supporting libraries the disclosure herein requires parameter adjustment and interaction with the customer management system as well as a database lookup.

According to the example in FIG. 6, the input image is downloaded or transmitted to the central system wherein an image analysis module is deployed. The image analysis module may also be equipped on a cloud server or on the field device itself. When equipped on the field device the processing may be on the edge, wherein the processor and non-transitory memory on the field device hosts the applications and/or modules, or it may be transmitted to a central system such as a cloud server wherein a result is returned to the field device for further processing. During preprocessing a number of steps may occur, including digitization (if needed), noise reduction, clarification, reduction of image or video size, skew detection and correction, color correction and detection, and other procedures that may improve the operation of the algorithm. The preprocessing module of FIG. 6 allows for preparation of the data from the picture or video to improve the performance of OCR or computer vision algorithms. In one aspect, the correction may take into account the type of lighting at the store or filling station or travel center, wherein the field device is capturing the image. In this regard the correction for various lighting may be done through filtering in the software, so that performance of the OCR algorithm may be improved. In another aspect, the preprocessing may identify if a false positive was returned for vehicle recognition, in other words, did an object appear to be a vehicle that was not, such as a layer of fog or an animal.

Next, the segmentation process segments the text (characters, words, lines) by breaking the image into subparts. The hierarchy of line level segmentation typically begins first, then followed by word level segmentation, and then ultimately character segmentation. Histogram projection method is one example for detecting segmentation. In the histogram projection method, the image (photo or video) is converted into a binary image of black and white pixels, the two pixels are often referred to as foreground pixels and background pixels. The method is conducted by counting the number of foreground pixels as compared to background pixels, and from that information a histogram is assembled, wherein the histogram's higher peaks may imply the corresponding number of foreground pixels are high, therefore indicating an object at that location. This is of course subject to whether or not the foreground is delineated white or black and whether or not it is a horizontal or vertical. Horizontal is typically used in line segmentation, while vertical is utilized for word and character segmentation.

Following segmentation, pattern matching and/or feature extraction is deployed for text recognition. Pattern matching, also known as matrix matching, pattern recognition, or image correlation utilizes stored images and matching to correctly identify the text. In feature extraction, the text is decomposed into features, such as lines, closed loops, directions, intersections and more. Classifiers are often employed such as k-nearest neighbor to compare image features with stored reference features to choose the nearest match. Dimensionality reduction may also be employed to further improve processing and computational efficiency. In newer implementations neural networks are employed to improve efficiency and also improve detection of non-standard text such as unique handwriting. In our example embodiment the state of the license plate may be recognized on one line, and the license plate number may be recognized character by character to detect and extract the text. Similar, the USDOT number may be detected by recognition of the first word "USDOT" and the remaining characters read in as the corresponding license number. Selection is performed from the stored patterns or representations or trained models. The selection results in classification and in the present embodiment accessing through the central system a database with corresponding USDOT information for developing a sales lead.

In other aspects the optical capture with a camera system, such as that on a field device, may not capture text and may focus on capturing representations (also known as unique identifiers) such as the make and model of the vehicle, the identity of the driver, and any other characteristics that may support logging of a vehicle and or driver for sales/lead generation (e.g. drivers license, operator license, phone number, address, height, weight, age). In other embodiment the OCR may be performed on the vehicle name, or a logo or branding on the side of the vehicle. Freight liners often have markings such as logos that may be identified and aid in developing a customer relationship with valuable insight on the vehicle and driver's movements, purchases, ownership, statistics, and more.

Turning now to FIG. 7, a diagram of an example of a unique identifier that may be stored in the relational database under a USDOT number. FIG. 7 is an example embodiment of what an entry in the database in FIG. 1 may represent. Information such as the VIN #, the license plate state, the license plate number along with make, model, and year may be available. Additional information such as the type of vehicle, the gross vehicle weight rating, the ownership, and more may be available in the database. Ownership information may include the size of the company, size of the fleet, the type of licenses the company has, and the type of goods are being hauled. A lookup or query, or search in the database may result in additional information that is provided by third-party vendors or by agencies. Such information is correlated with the photo or video data and included in the customer management system or CRM for generating a sales lead.

Figure 8:
FIG. 8 is an illustration of an example of a field device executing a sales/lead application.

Referring now to FIG. 8, a screen capture of an example embodiment of a display screen of a field device such as a mobile device (e.g., smart phone, tablet, mobile computer). For example, the mobile device may be configured as a field device described with respect to FIG. 1. An icon (e.g., "Pic2Lead" image) can be used to launch the sales lead creating module or other similar application for converting a picture and/or video into a sales lead. The icon can be shown with other icons for other (unrelated) application on a home screen of the mobile device.

Continuing with FIG. 8, is a screen capture of the display screen showing a login to allow a user to log into the application. The login screen allows the user to complete a log in process and agree to terms and conditions. Such login operation may also be used to evaluate system requirements, such requirements may be verified at installation of the application through an online store such as Apple's App Store™ or Google's Play Store™, or through certification and installation through a developer account or otherwise installed on tangible media, wherein the contents of which is loaded into non-transitory memory and instructions sent to a processing unit.

Not depicted in FIG. 8 is the display screen of the mobile device showing a window for asking permission from the user to allow the application to access the camera of the mobile device, and also a privacy statement or terms and conditions or other consent. Location information may be obtained by a GPS module on the field device for determining geographical coordinates and embedding the GPS data along with other attributes such as time, temperature, and other photo or video specific information such as format, audio format, ISO, lens, zoom, shutter speed, and more as will be known by those of skill in the art. Furthermore, with the embedded information including the camera and location features enabled, the mobile device can enable image and location data to be obtained to allow geo-tagging of photo and video data.

Figure 9:
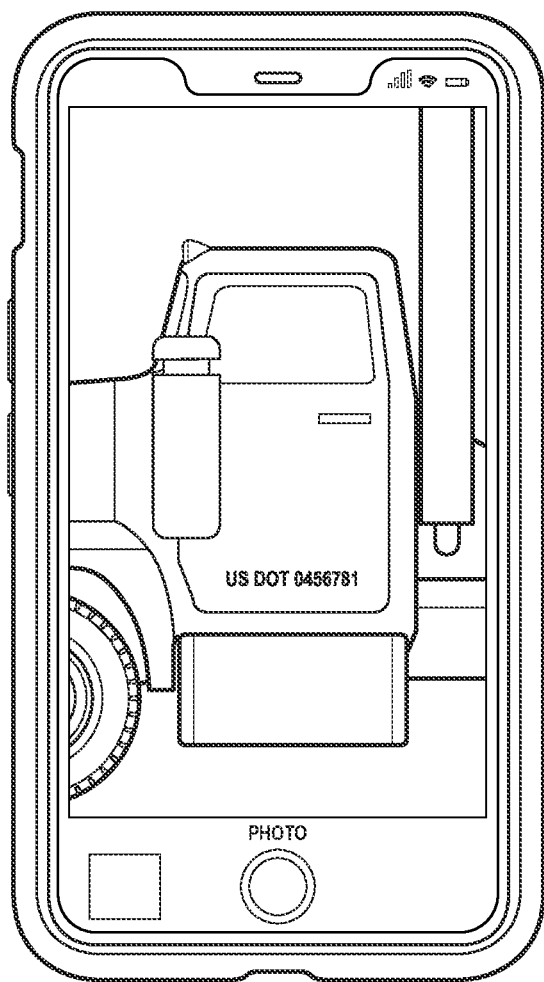
FIG. 9 is an illustration of an example vehicle with a USDOT number.

In the example embodiment of FIG. 9, the mobile device is connected by a communications adapter (e.g. Broadcom modem™ or other communications hardware on the field device) to a central system through a cellular communication network connection, wherein the computer vision and OCR processing is offloaded to server processing units, and the results are returned to the mobile device. In this embodiment the mobile device also known as the field device can conserve resources and offload processing requirements, such benefits also include a backup repository within the central system.

FIG. 9 is a screen capture of the display screen of the mobile device showing a view from one of any number of lenses that are incorporated in the mobile device. At this point, the user may be able to capture an image of specific unique identifier, such as the USDOT number that may be printed on an outside of the vehicle that the user may intend to target as a potential customer. The user can press a "shutter" button that allows the user to capture the image (take the picture and or video). This is one example, in other aspects such as an IP camera there will be a continuous shutter and stream of video or photos wherein a user will not need to independently capture the image data. Further, in additional aspects of computer vision applications within the central system or the field device, the vehicle type, model, year, color, license plate, and driver information may be obtained through pressing of a shutter or through continuous recording or automatic image capturing based on movement or sensor detection.

Figure 10A:
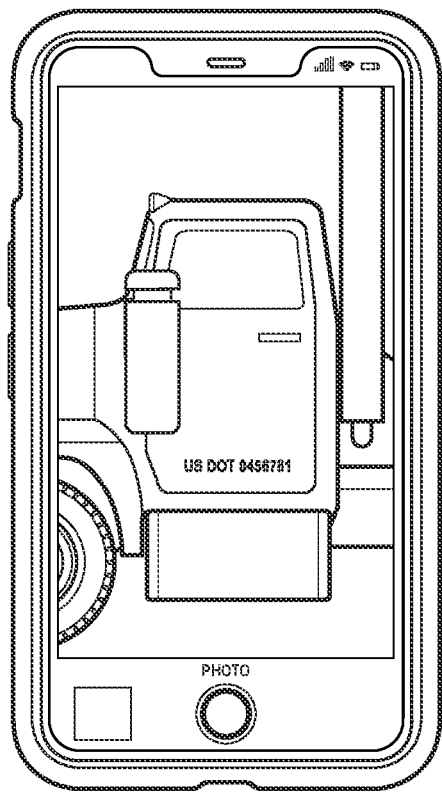
FIG. 10A-C is an illustration of an example field device taking a photo with the sales/lead application of a vehicle with a USDOT number.
Figure 10B:
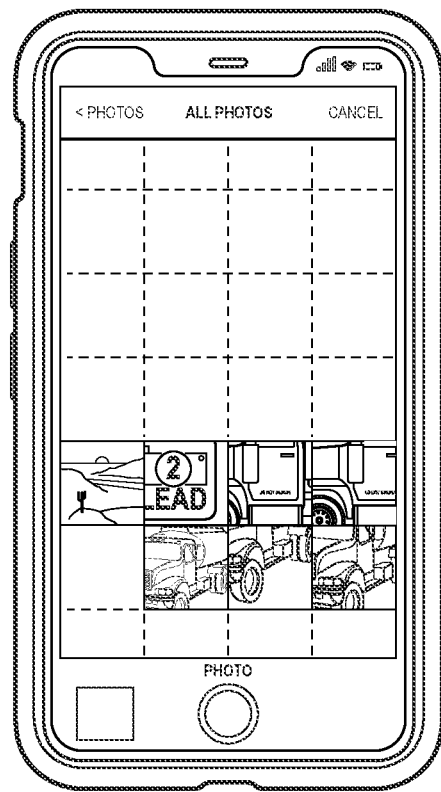

FIGS. 10A and 10B are screen captures of the display screen of an example mobile device wherein a user may decide to access pre-saved pictures from a library, gallery, or other storage element on the mobile device. Instead of capturing a new picture (photo or video) using the shutter button, the user may press the gallery button, which leads to the screen capture shown in FIG. 10B showing thumbnail images of multiple pictures that have been previously taken. At this point, the user can select any desired photo or video, particularly one that may show an identification marking such as a unique identifier or a parameter of the vehicle or the driver (e.g., USDOT number, license plate number, make, model).

Figure 10C:
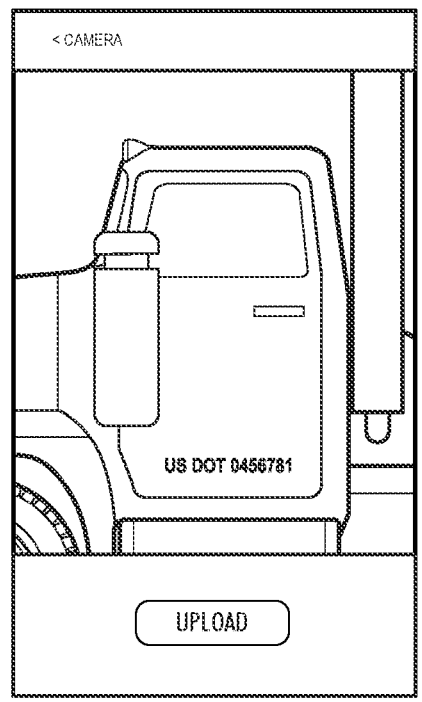

FIG. 10C is a screen capture of a selected image (e.g., photo, picture, etc.) that may have been captured in the process described with respect to FIG. 9 or selected from a group of pictures as described with respect to FIGS. 10A and 10B. At this point, the user can upload the picture using an "upload" button or other interactive menu that allows the picture or video to be uploaded into the application. In the upload process, the mobile device (e.g., field device 140) may be configured to transmit the selected image to the central system 120 shown in FIG. 1 for further processing (e.g., pre-processing, OCR, computer vision), storage, addition to the customer management system.

When the image, such as a photo or video is received at the central system 120, the central system 120 and image analysis module 160 may be configured to determine if a USDOT number can be detected or recognized from the image. If not, the central system 120 may send a message back to the mobile device or field device 140 communicating an error or a unique identifier not found. At such time the field device may perform additional image captures, or the central system may default into identifying characteristics of the vehicle and/or driver.

Figure 11A:
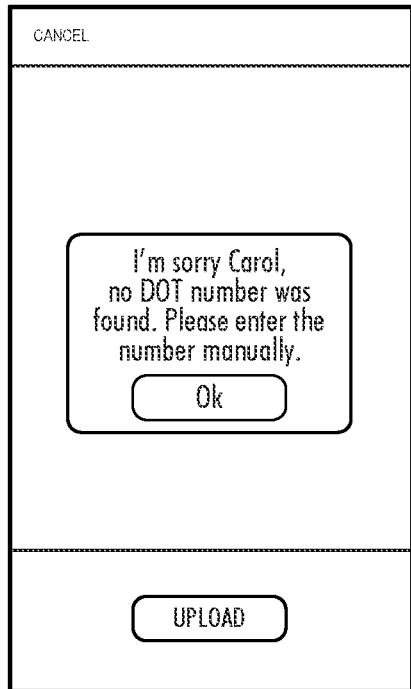
FIG. 11A-C is an illustration of an example field device executing a sales/lead application taking manual entry of a unique identifier such as a USDOT number.

FIG. 11A is a screen capture of the display screen of an example mobile device including a window showing the message to indicate that a USDOT number was not detected or recognized from the image. From this window, the user may select the OK button to manually enter the USDOT number. Otherwise, by pressing a cancel button, the user can return back to the camera feature described with respect to FIGS. 9-10C to retake the picture or select another picture from the gallery.

Figure 11B:
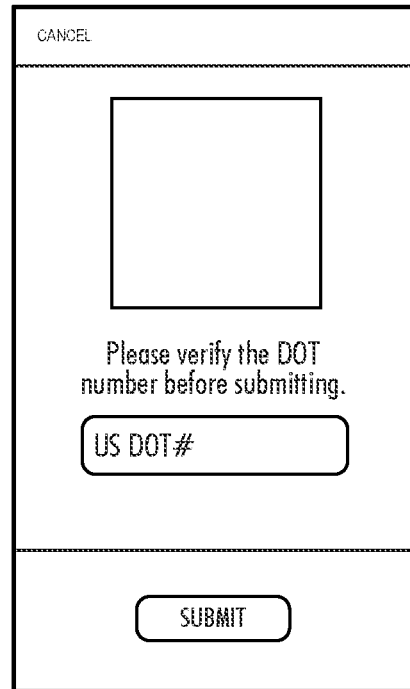
Figure 11C:
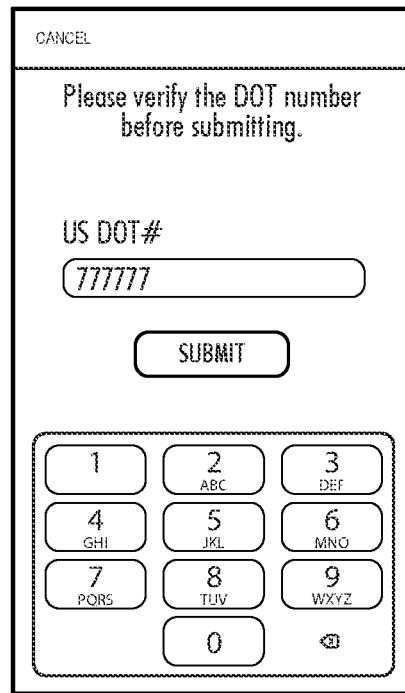

FIG. 11B is a screen capture of the display screen of an example mobile device enabling the user to manually enter the USDOT number. FIG. 11C is a screen shot showing a keypad that allows the user to enter the number. After entering the user may press a "submit" button. At this time, the mobile device (e.g., field device 140) can submit the information to the central system 120 to process the USDOT number without the image analysis device 160.

Figure 12A:
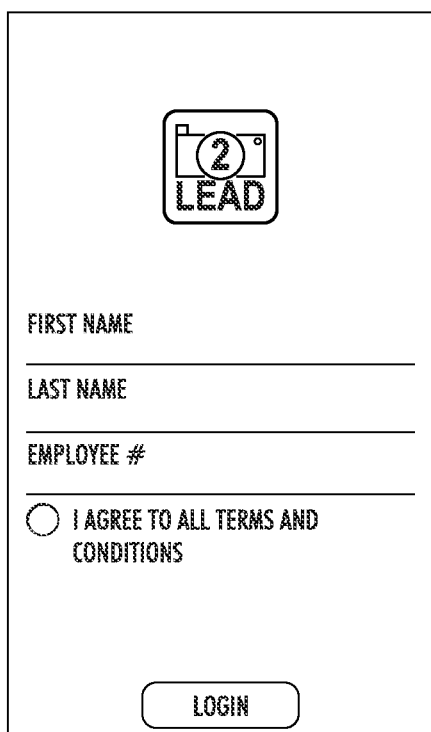
FIG. 12A-C is an illustration of an example field device executing a sales/lead application and taking an image of a vehicle.

FIG. 12A is another example of a screen shot of a home screen for logging in.

Figure 12B:
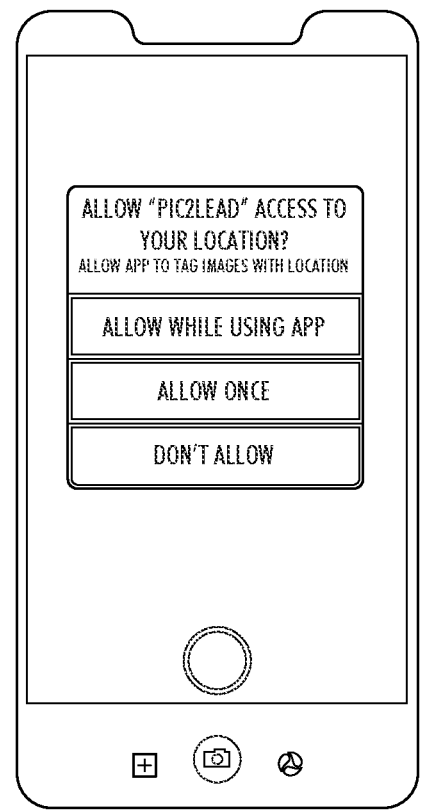

FIG. 12B is another example of a permission screen.

Figure 12C:
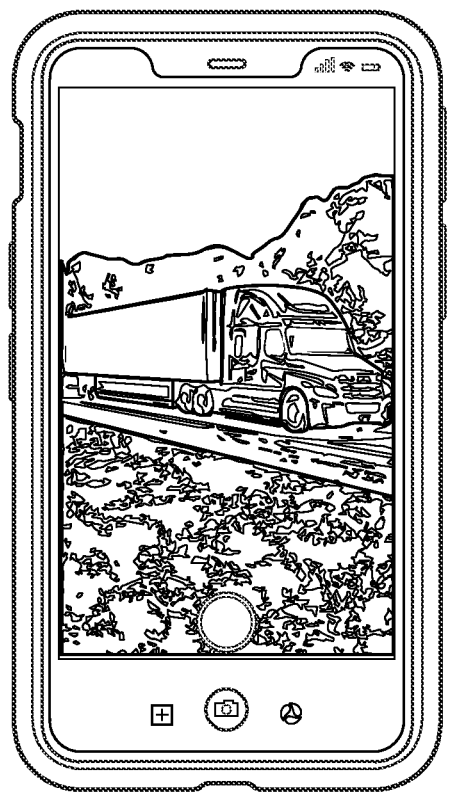

FIG. 12C is another example of capturing a vehicle from a field device.

FIG. 13A is an example of a screen capture of a field device of another screen for allowing a plurality of identification information to be entered manually. In this example, multiple USDOT numbers can be entered and can be uploaded in one process. In other embodiments a user may be able to enter multiple attributes about the vehicle and/or driver such as the vehicle make, model, and color, and license plate number to name a few (additional fields disclosed in FIG. 7).

FIG. 13B is a screen capture of an example field device utilizing a gallery to upload multiple images (photos and videos) to process within the field device at the edge of the network.

FIG. 13C is an example of another screen that may be shown when the identification information is not recognized from an image.

Figure 14:
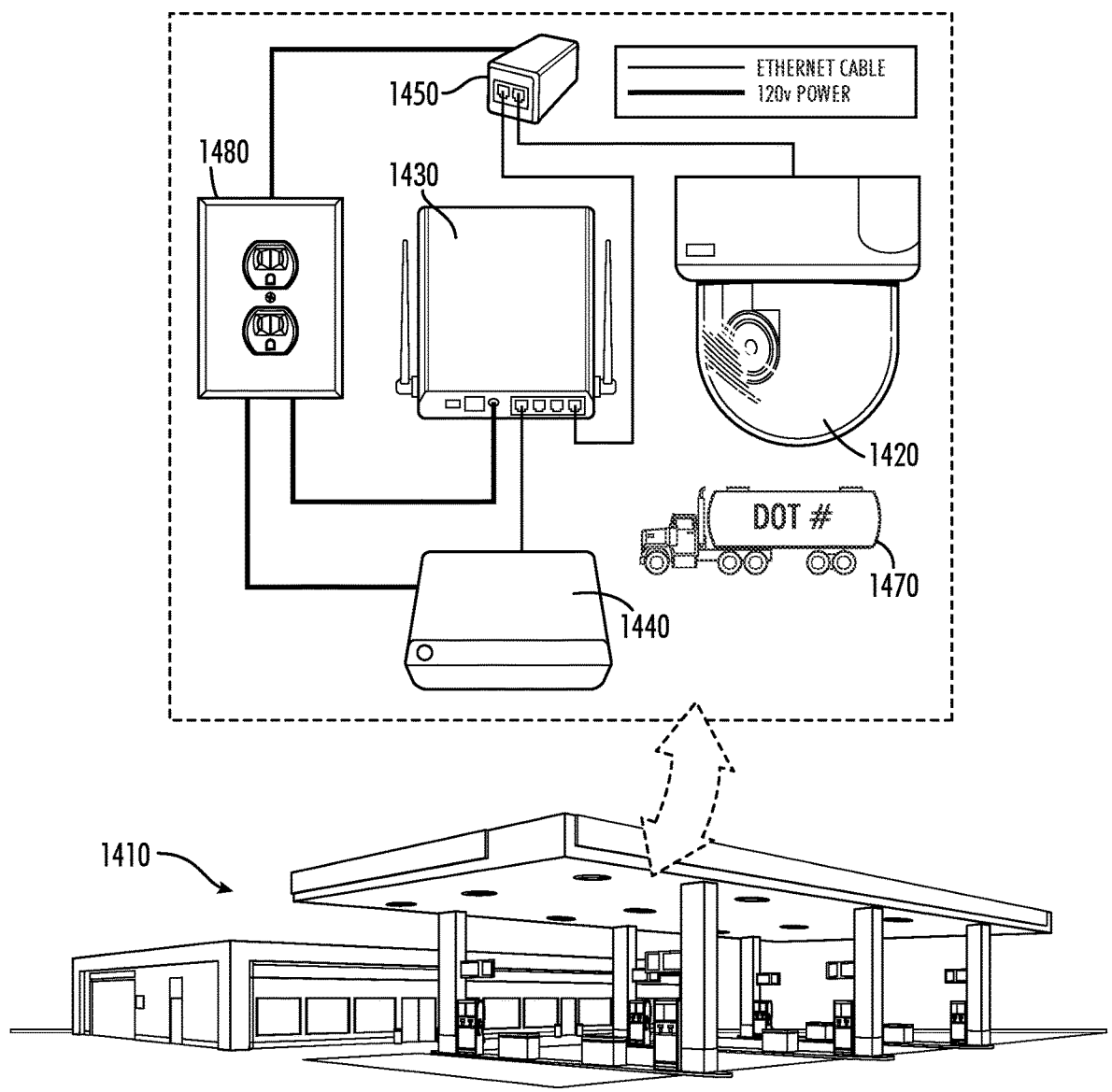
FIG. 14 is an illustration of an example system for using identification information on a vehicle and/or driver to generate a sales lead.

FIG. 14 is an illustration of an example system for using identification information, such as a unique identifier on a vehicle and/or driver to generate a sales lead. The system includes a store environment 1410 wherein a wireless hub/router 1430 and a wired communications protocol 1450 are capable of transmitting photo or video data from a field device 1420, in this example an IP camera to an edge computing device such as Amazon Web Services Panorama™ device that serves as a central system 1440. The IP camera may consist of specifications that include 2.0-megapixel resolution or higher sensor, or a sensor capable of 720p, 1080p, and or 4 k. The lens system may have a fixed lens, a variable lens, or a zoom lens, with either manual or automatic iris control, as well as include additional hardware aspects such as IR corrected lenses. The IP camera may also have video capture at 10 fps or better and in some cases capable of 30 fps up to 60 fps. In other aspects, the IP camera or the field device may also be able to capture audio and may use audio capture as a unique identifier.

In the example of FIG. 14, the communication network is both wired 1450 and wireless 1430, in other aspects it may be only wire or it may be only wireless. In the wireless aspect, a modem is connected to a router wherein the wireless signal is transmitted connecting the field device 1420 to the central system 1440. The system may be powered by 120v on premise grid power 1480 or through a system of batteries, or may be tied to a renewable source, such as a solar panel fixed to a battery to provide edge power to remote field devices or field devices in which power to the grid may be difficult. In the example embodiment the central system 1440 comprises an Amazon Panorama device for access to and use of computer vision technologies. In other embodiments other devices or products may be used such as Microsoft Azure cloud based computer vision or the computing device may be a Raspberry Pi configured with computer vision software that allows for fast and reliable identification and OCR of unique identifiers on vehicles 1470 and/or drivers.

In the example, the store environment 1410 is a travel plaza such as the Pilot Flying J Travel Center™ wherein a vehicle 1470 may visit for refueling or purchase of goods and/or services. In other embodiments it may be a store or a filling station, wherein a vehicle 1470 with a unique identifier may be present. The unique identifier is acquired through the field device, wherein the field device transmits the picture or video data to a central system for processing. Once the unique identifier is known and matched with a record in the customer management system or through a lookup on a third-party database a business rules engine may then rank the sales lead and provide a sales agent with information that is of record and accumulated through the system. The system operates in a redundant fashion and information is cumulative as it relates to unique identifiers and generation of new sales leads.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

Therefore, the following is claimed:

1. A system for generating a sales lead from a photo of a vehicle, comprising:
   a vehicle with a unique identifier;
   a field device, comprising:
      a sales/lead application executing in non-transitory memory;
      a camera module configured for the sales/lead application, wherein the camera module is equipped to take a photo of the vehicle with the unique identifier, the photo comprising photo data;
   a communication network configured to transmit the photo data corresponding to the photo from the field device;
   a central processing environment, comprising:
      a network connection configured to receive the photo data from the field device;
      a relational database configured with a data table comprising a plurality of corresponding unique identifiers and additional information;
      an image analysis module to extract text information from the photo data received from the field device by a computer vision process employing at least one of pattern matching and feature extraction to generate a digital unique vehicle identifier;
      a customer management system configured to receive the unique vehicle identifier from the image analysis module and perform a lookup in the relational database for the digital unique identifier to identify a set of additional information and correlate the set of additional information with the photo data, wherein the set of additional data comprises commercial entity information;

a sales lead creating module in communication with the customer management system to generate a sales lead, wherein the sales lead is generated at least in part by the central system coordinating at least the field device, the customer management system, and the relational database based at least in part on the digital unique identifier and the set of additional information, wherein the sales lead is assigned a score corresponding to the quality of the sales lead, the score determined at least in part on the digital unique identifier and the commercial entity information; and a front end website wherein a user may access the customer management system to view the sales lead.

2. The system of claim 1, wherein the image analysis module is configured with a preprocessing module, the preprocessing module preprocesses the photo data by applying at least one filter.

3. The system of claim 1, wherein the central system is a cloud server that hosts modules and applications.

4. The system of claim 1, wherein the field device is a smartphone.

5. The system of claim 1, wherein the communication network comprises at least a cellular communication network.

6. The system of claim 1, wherein the unique identifier is a United States Department of Transportation USDOT number.

7. The system of claim 1, wherein the unique identifier is a license plate number.

8. The system of claim 1, further comprising a business rules engine, wherein the business rules engine scores the sales lead.

9. A method for generating a sales lead from a photo of a vehicle at a service plaza, comprising:

provisioning a relational database with a dataset comprising a plurality of corresponding unique identifiers and additional information;

provisioning the field device of claim 1 with a sales/lead application;

executing the sales/lead application on non-transitory memory of the field device;

capturing a photo of a vehicle with a unique identifier;

transmitting photo data corresponding to the photo to a central processing environment;

processing the photo data for optical character recognition with an image analysis module, the processing comprising at least one of pattern matching and feature extraction;

generating a digital unique vehicle identifier from the photo data based on the processing;

accessing the relational database to perform a lookup of the digital unique vehicle identifier after receiving at a customer management system, the unique vehicle identifier to identify a set of additional information that can be correlated with the photo and/or photo data, the additional information comprises commercial entity information; and generating a sales lead based on at least the digital unique vehicle identifier and the set of additional information returned by the lookup based at least in part on a coordination of the field device, the customer management system, and the relational database, by the customer management system, wherein the sales lead is assigned a score corresponding to the quality of the sales lead, the score determined at least in part on the digital unique identifier and the commercial entity information.

10. The method of claim 9, further comprising a customer management system, wherein the customer management system accesses the relational database to perform a lookup of the unique vehicle identifier.

11. The method of claim 9, wherein provisioning the relational database with the dataset of unique identifiers provisions a set of United States Department of Transportation USDOT numbers.

12. The method of claim 9, wherein provisioning the relational database with the dataset of unique identifiers provisions a set of license plate numbers.

13. The method of claim 9, wherein transmitting the photo data to a central system transmits the data over a cellular network.

14. The method of claim 9, wherein processing the photo data for optical character recognition further processes through the image analysis module the photo data for vehicle recognition of make and model.

15. The method of claim 9, wherein capturing the photo of the vehicle with the unique identifier further captures the Global Positioning System GPS location of the vehicle.

16. The method of claim 9, further comprising scoring the sales lead based on at least the number of vehicles operating under a commercial entity.

17. The method of claim 16, wherein the scoring of the sales lead places a tag of either hot, mild, or cold on the sales lead.

\* \* \* \* \*